(12) United States Patent
Allen (10) Patent No.: US 7,340,145 B2
(45) Date of Patent: Mar. 4, 2008

(54) FIBER OPTIC SPLICE STORAGE APPARATUS AND METHODS FOR USING THE SAME

(75) Inventor: Barry W. Allen, Siler City, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/584,958

(22) Filed: Oct. 23, 2006

(65) Prior Publication Data

US 2007/0104447 A1    May 10, 2007

Related U.S. Application Data

(60) Provisional application No. 60/729,575, filed on Oct. 24, 2005.

(51) Int. Cl.
*G02B 6/00* (2006.01)
(52) U.S. Cl. .................. 385/135; 385/136; 385/137
(58) Field of Classification Search ......... 385/134–137
See application file for complete search history.

(56) References Cited

U.S. PATENT DOCUMENTS

| | | | | |
|---|---|---|---|---|
| 5,080,459 A | * | 1/1992 | Wettengel et al. | 385/95 |
| 5,278,933 A | | 1/1994 | Hunsinger et al. | 385/135 |
| 5,323,480 A | | 6/1994 | Mullaney et al. | 385/135 |
| 5,440,665 A | | 8/1995 | Ray et al. | 385/135 |
| 5,515,472 A | | 5/1996 | Mullaney et al. | 385/135 |
| 5,528,718 A | | 6/1996 | Ray et al. | 385/136 |
| 5,657,413 A | | 8/1997 | Ray et al. | 385/139 |
| 5,956,449 A | * | 9/1999 | Otani et al. | 385/134 |
| 6,009,225 A | | 12/1999 | Ray et al. | 385/135 |
| 6,424,782 B1 | | 7/2002 | Ray | 385/135 |

FOREIGN PATENT DOCUMENTS

| | | |
|---|---|---|
| EP | 0 055 231 A1 | 6/1982 |
| EP | 1 050 765 A1 | 11/2000 |
| WO | WO 89/05989 A1 | 6/1989 |
| WO | WO 03/098306 A1 | 11/2003 |

OTHER PUBLICATIONS

International Search Report and Written Opinion for PCT/US2006/041290; date of mailing Mar. 1, 2007.

* cited by examiner

*Primary Examiner*—Frank G. Font
*Assistant Examiner*—Michael P. Mooney
(74) *Attorney, Agent, or Firm*—Myers Bigel Sibley & Sajovec (57) ABSTRACT

A fiber optic splice storage apparatus includes a central segment defining a splice chamber configured to receive a plurality of fiber optic splices, a first slack fiber storage segment pivotally connected to a first end of the central segment and having an open position extending from the first end away from the central segment and a closed position extending over the central segment, and a second slack fiber storage segment pivotally connected to a second end of the central segment, opposite the first end, the second slack fiber storage segment having an open position extending from the second end away from the central segment and a closed position extending over the central segment. A first plurality of slack fiber guide members on the first slack fiber storage segment are configured to receive and retain a loop of optical fibers and a second plurality of slack fiber guide members on the second slack fiber storage segment are configured to receive and retain a loop of optical fibers.

26 Claims, 10 Drawing Sheets

FIBER OPTIC SPLICE STORAGE APPARATUS AND METHODS FOR USING THE SAME

RELATED APPLICATIONS

The present application claims priority from U.S. Provisional Application No. 60/729,575, filed Oct. 24, 2005, the disclosure of which is hereby incorporated herein in its entirety by reference.

BACKGROUND OF THE INVENTION

The present invention relates to optical fiber products and, more particularly, to optical fiber storage products and methods for using the same.

Optical fiber networks are increasingly being installed to support high-speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was conventionally used.

In various locations in a fiber optic network, fibers must be spliced or the like in an organized fashion. Fiber splice trays or the like may be used to provide such splices in an organized fashion. However, various applications may have limited space available for receiving such splice trays, which may constrain the ability to provide a suitable splice tray. Furthermore, conventional splice trays are typically flat and nonmoving, thus, generally requiring the splice technician to manually load and extract the fibers from the tray.

Storing and removing all the fibers at the same time may be an important feature in maintaining a randomly loaded splice tray. For example, fiber 4 may be spliced day one and fiber 6 may be spliced day 2 and the rest may be spliced over a period of time in a random order for a randomly loaded splice tray. If all the fibers are not completely unbundled each time a splice is made, an unmanageable rat's nest of tangled fibers may result from repeated access for adding fiber splices.

SUMMARY OF THE INVENTION

Embodiments of the present invention include fiber optic splice storage apparatus that include a central segment defining a splice chamber configured to receive a plurality of fiber optic splices, a first slack fiber storage segment pivotally connected to a first end of the central segment and having an open position extending from the first end away from the central segment and a closed position extending over the central segment, and a second slack fiber storage segment pivotally connected to a second end of the central segment, opposite the first end, the second slack fiber storage segment having an open position extending from the second end away from the central segment and a closed position extending over the central segment. A first plurality of slack fiber guide members on the first slack fiber storage segment are configured to receive and retain a loop of optical fibers and a second plurality of slack fiber guide members on the second slack fiber storage segment are configured to receive and retain a loop of optical fibers.

In other embodiments, a first and second fiber guide member are provided on the central segment in the splice chamber. The first fiber guide member and one of the first plurality of slack fiber guide members define a first fiber path extending from the central segment to the first slack fiber storage segment. The second fiber guide member and one of the second plurality of slack fiber guide members define a second fiber path extending from the central segment to the second slack fiber storage segment. The first fiber guide member may be a fiber entrance to the splice chamber and the second fiber guide member may be a fiber exit to the splice chamber. It will be understood that fiber may exit and/or enter either the fiber entrance or exit as such terminology generally refers to the context of associate signals or network locations associated with respective fibers.

In other embodiments, the central segment further includes a third fiber guide member and a fourth fiber guide member. The third fiber guide member and a second one of the first plurality of slack fiber guide members define a third fiber path extending from the central segment to the first slack fiber storage segment. The fourth fiber guide member and a second one of the second plurality of slack fiber guide members define a fourth fiber path extending from the central segment to the second slack fiber storage segment. An intersection of the first and third fiber paths define a first fiber cross-over location proximate an intermediate portion of the first end to limit bending of optical fibers extending along the first and third fiber paths when the first slack fiber storage segment is moved from its opened position to its closed position. The second and fourth fiber paths define a second fiber cross-over location proximate an intermediate portion of the second end to limit bending of optical fibers extending along the second and fourth fiber paths when the second slack fiber storage segment is moved from its opened position to its closed position. The third fiber guide member and the further fiber guide member may be a splice receiving member. The first and second one of the first plurality of slack fiber guide members and the first and second one of the second plurality of slack fiber guide members may each be an opposed pair of guide members.

In further embodiments, the fiber optic splice storage apparatus further includes a storage apparatus-mounting member on a third end of the central segment. The third end extends from the first end to the second end. The storage apparatus-mounting member is configured to allow the fiber optic splice storage apparatus to be pivotally mounted to an enclosure. The first fiber guide member on the central segment may be a fiber entrance to the splice chamber on the third end of the central segment and the second fiber guide member on the central segment may be a fiber exit to the splice chamber on the third end of the central segment and the storage apparatus mounting member may be positioned between the fiber entrance and the fiber exit.

In other embodiments, a first hinge pivotally connects the first slack fiber storage segment to the central segment and a second hinge pivotally connects the second slack fiber storage segment to the central segment. The central segment, the first slack fiber storage segment and the second slack fiber storage segment may be polycarbonate. The first and second hinges may be living hinges and the central segment, the first slack fiber storage segment and the second slack fiber storage segment may be polypropylene (PP). The fiber optic splice storage apparatus may be a splice tray. When the first and second slack fiber storage segments are in their closed positions, the second slack fiber storage segment may extend over the first slack fiber storage segment.

In yet other embodiments, the fiber optic splice storage apparatus further includes a first plurality of optical fibers extending along the first fiber path and the third fiber path that are looped on the first slack fiber storage segment so that the first plurality of optical fibers crosses over itself proximate the first fiber cross-over location. A second plurality of optical fibers extends along the second fiber path and the fourth fiber path that are looped on the second slack fiber storage segment so that the second plurality of optical fibers crosses over itself proximate the second fiber cross-over location. One of the first pluralities of optical fibers may be spliced to corresponding ones of the second plurality of optical fibers to define the plurality of fiber optic splices. The first plurality of optical fibers may be releasably retained with a loop therein on the first slack fiber storage segment by the first and second one of the first plurality of slack fiber guide members. The second plurality of optical fibers may be releasably retained with a loop therein on the second slack fiber storage segment by the first and second one of the second plurality of slack fiber guide members. Locations of the first fiber cross-over point and the second fiber cross-over point may be selected to provide a minimum bend radius for the first and second plurality of optical fibers when the first and second slack fiber storage segments are in their closed positions.

In other embodiments of the present invention, a tri-fold fiber splice tray includes a central segment and first and second slack fiber storage segments. The central segment defines a splice chamber configured to receive a plurality of fiber optic splices. The first slack fiber storage segment is pivotally connected to a first end of the central segment and has an open position extending from the first end away from the central segment and a closed position extending over the central segment. The second slack fiber storage segment is pivotally connected to a second end of the central segment, opposite the first end. The second slack fiber storage segment has an open position extending from the second end away from the central segment and a closed position extending over the central segment. Tray mounting legs extend from a third end of the central segment, the third end extending from the first end to the second end. The tray mounting legs are configured to allow the splice tray to be pivotally mounted to an enclosure. A fiber entrance to the splice chamber is on the third end of the central segment between the tray mounting legs and the second end. A fiber exit to the splice chamber is on the third end of the central segment between the tray mounting legs and the first end. A first and second slack fiber guide member on the first slack fiber storage segment are configured to receive and retain a loop of optical fibers. The fiber entrance and the first slack fiber guide member define a first fiber path extending from the central segment to the first slack fiber storage segment. A third and fourth slack fiber guide member on the second slack fiber storage segment are configured to receive and retain a loop of optical fibers. The fiber exit and the third slack fiber guide member define a second fiber path extending from the central segment to the second slack fiber storage segment. A splice receiving member is provided on the central segment. The splice receiving member and the second slack fiber guide member define a third fiber path extending from the central segment to the first slack fiber storage segment. The splice receiving member and the fourth slack fiber guide member define a fourth fiber path extending from the central segment to the second slack fiber storage segment. An intersection of the first and third fiber paths define a first fiber cross-over location proximate an intermediate portion of the first end to limit bending of optical fibers extending along the first and third fiber paths when the first slack fiber storage segment is moved from its opened position to its closed position. The second and fourth fiber paths define a second fiber cross-over location proximate an intermediate portion of the second end to limit bending of optical fibers extending along the second and fourth fiber paths when the second slack fiber storage segment is moved from its opened position to its closed position.

In yet other embodiments, methods of storing slack fiber in a fiber optic splice storage apparatus include storing a loop of a first plurality of fibers on a first slack fiber storage segment of the splice storage apparatus pivotally connected to a first end of a central segment of the splice storage apparatus. A loop of a second plurality of fibers is stored on a second slack fiber storage segment of the splice storage apparatus pivotally connected to a second end of the central segment, opposite the first end. The first slack fiber storage segment is folded to a closed position extending over the central segment and the second slack fiber storage segment is folded to a closed position extending over the central segment.

In further embodiments, storing the loop of the first plurality of fibers includes twisting the first plurality of fibers to form the loop with a fiber cross-over location positioned proximate a midpoint of the connection between the first slack fiber storage segment and the central segment. Storing the loop of the second plurality of fibers includes twisting the second plurality of fibers to form the loop with a fiber crossover location positioned proximate a midpoint of the connection between the second slack fiber storage segment and the central segment. Storing the loop of the first plurality of fibers may include positioning a first segment of the first plurality of fibers in a first slack fiber guide member on the first slack fiber storage segment and a second segment of the first plurality of fibers in a second slack fiber guide member on the first slack fiber storage segment. Storing the loop of the second plurality of fibers may include positioning a first segment of the second plurality of fibers in a first slack fiber guide member on the second slack fiber storage segment and a second segment of the second plurality of fibers in a second slack fiber guide member on the second slack fiber storage segment.

In other embodiments, the method further includes coupling one of the first plurality of fibers to a selected one of the second plurality of fibers to form a splice therebetween and positioning the splice in a splice receiving member on the central segment. Coupling one of the first plurality of fibers may include moving the first and second slack fiber storage elements to their open positions, removing a length of slack fiber of the one of the first plurality of fibers from the first and second slack fiber guide members on the first slack fiber storage element, removing a length of slack fiber of the selected one of the second plurality of fibers from the first and second slack fiber guide members on the second slack fiber storage element, and splicing ends of the removed lengths of slack fiber of the one of the first plurality of fibers and the selected one of the second plurality of fibers to form the splice therebetween.

In yet further embodiments, splicing ends of the removed lengths is followed by re-storing the removed length of slack fiber of the one of the first plurality of fibers to the loop of the first plurality of fibers and re-storing the removed length of slack fiber of the selected one of the second plurality of fibers to the loop of the second plurality of fibers. The first slack fiber storage segment is folded to the closed position extending over the central segment and the second slack fiber storage segment is folded to the closed position extending over the central segment.

In other embodiments, removing the length of slack fiber of the one of the first plurality of fibers includes removing the loop of the first plurality of fibers from the first slack fiber storage element and removing the length of slack fiber of the selected one of the second plurality of fibers includes removing the loop of the second plurality of fibers from the second slack fiber storage element. Re-storing the removed length of slack fiber of the one of the first plurality of fibers to the loop of the first plurality of fibers includes re-storing the loop of the first plurality of fibers to the first slack fiber storage segment and re-storing the removed length of slack fiber of the selected one of the second plurality of fibers includes re-storing the loop of the second plurality of fibers to the second slack fiber storage segment.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 1:
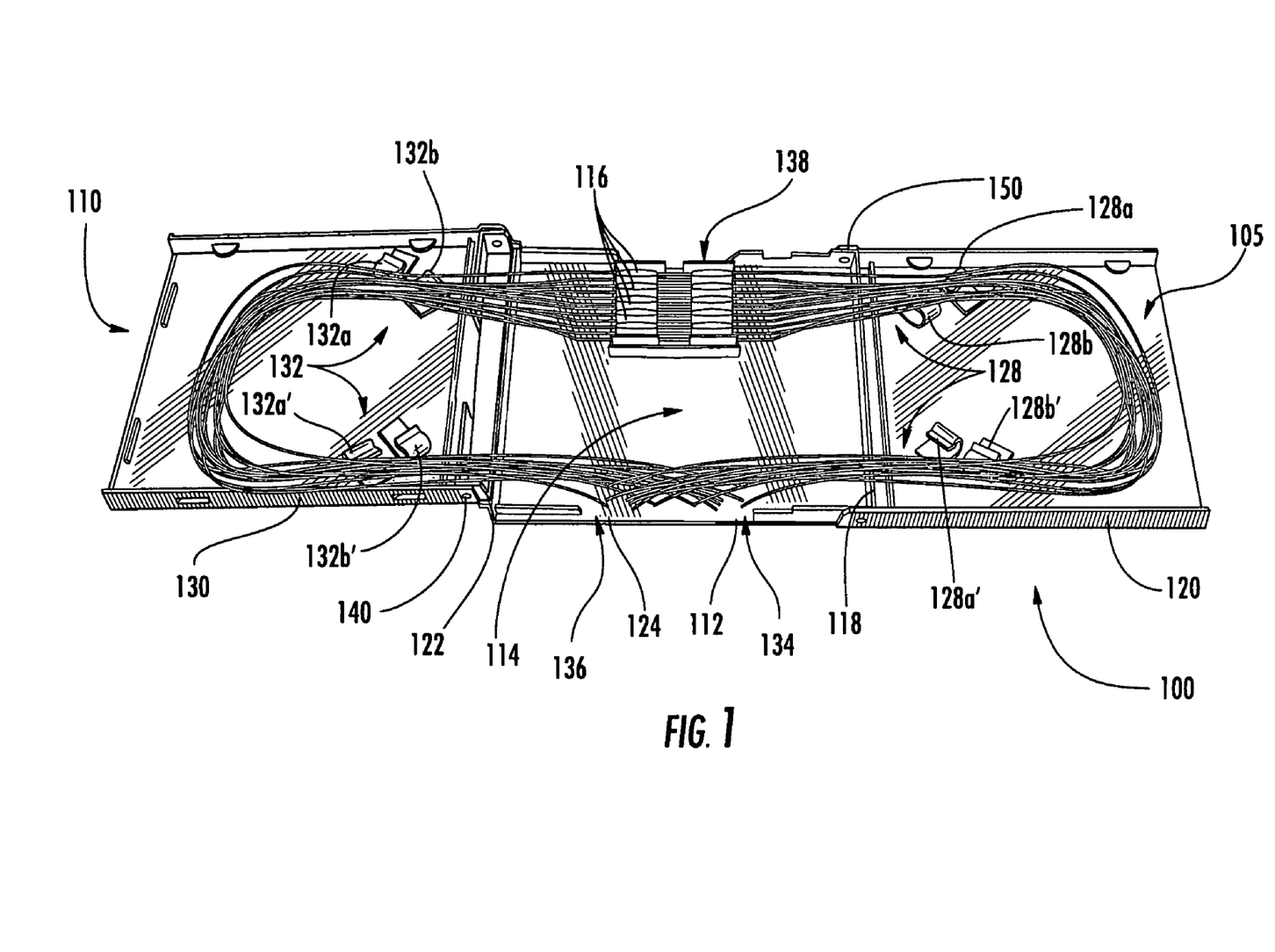
FIG. 1 is a perspective view illustrating a fiber optic splice storage apparatus including two pluralities of optical fibers according to some embodiments of the present invention.
Figure 2:
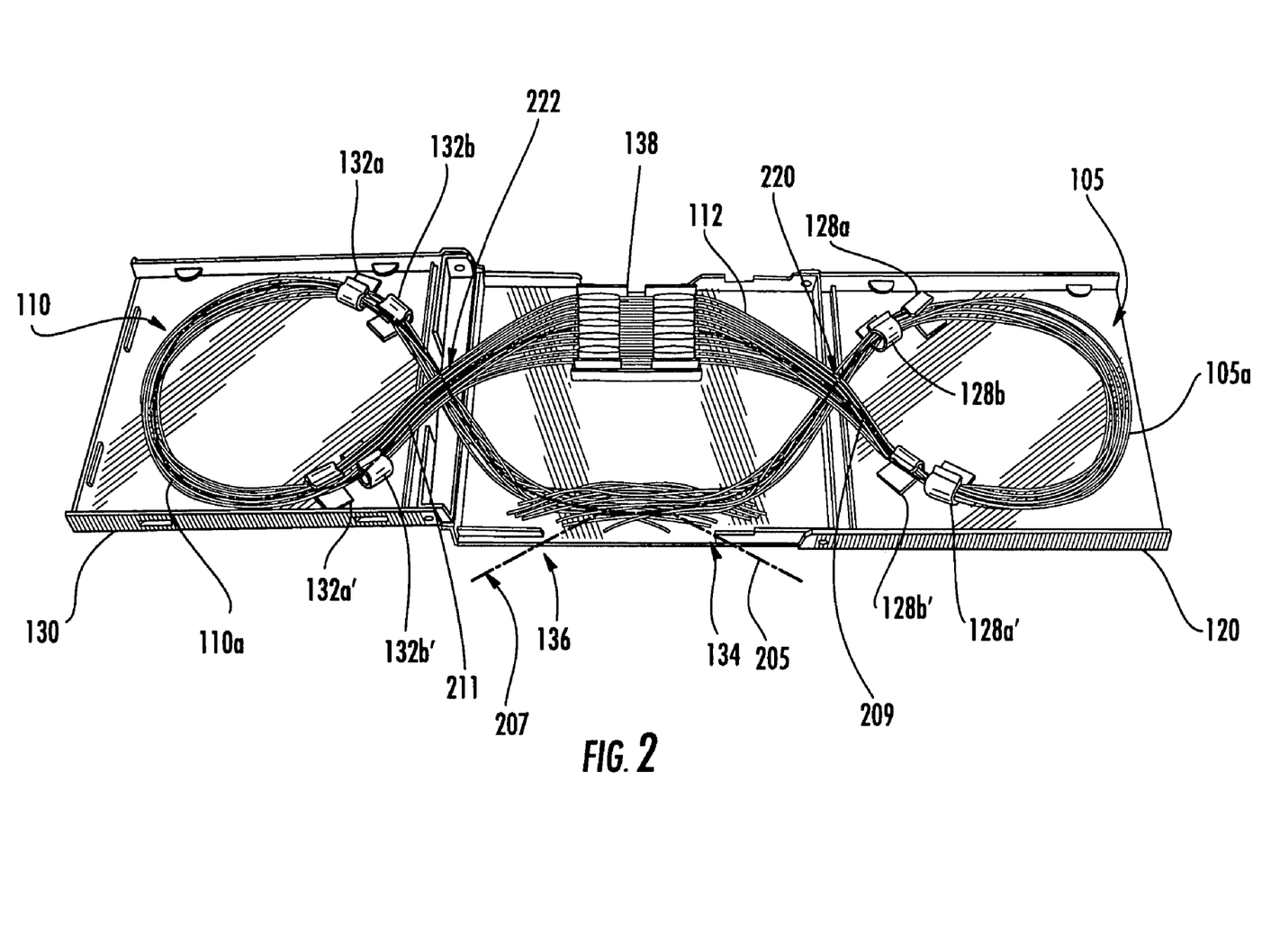
FIG. 2 is a perspective view of the apparatus of FIG. 1 with the respective pluralities of optical fibers twisted to form loops according to some embodiments of the present invention.

Fiber optic splice storage apparatus according to some embodiments of the present invention will now be described with reference to FIGS. 1-9. Referring first to the embodiments illustrated in FIGS. 1 and 2, a fiber optic splice storage apparatus 100 is illustrated having a first plurality of optical fibers 105 and a second plurality of optical fibers 110 therein. More particularly, the fiber optic splice storage apparatus illustrated in FIGS. 1 and 2 is shown as a tri-fold hinging splice tray. The apparatus 100 may be used, for example, in closures, cabinets, pedestals, boxes, shelves and the like where splices and/or splitters are provided between respective fiber optic cables and provide storage for associated slack fiber that may be needed in connection with forming the splices or the like using, for example, external splicing equipment.

Figure 6:
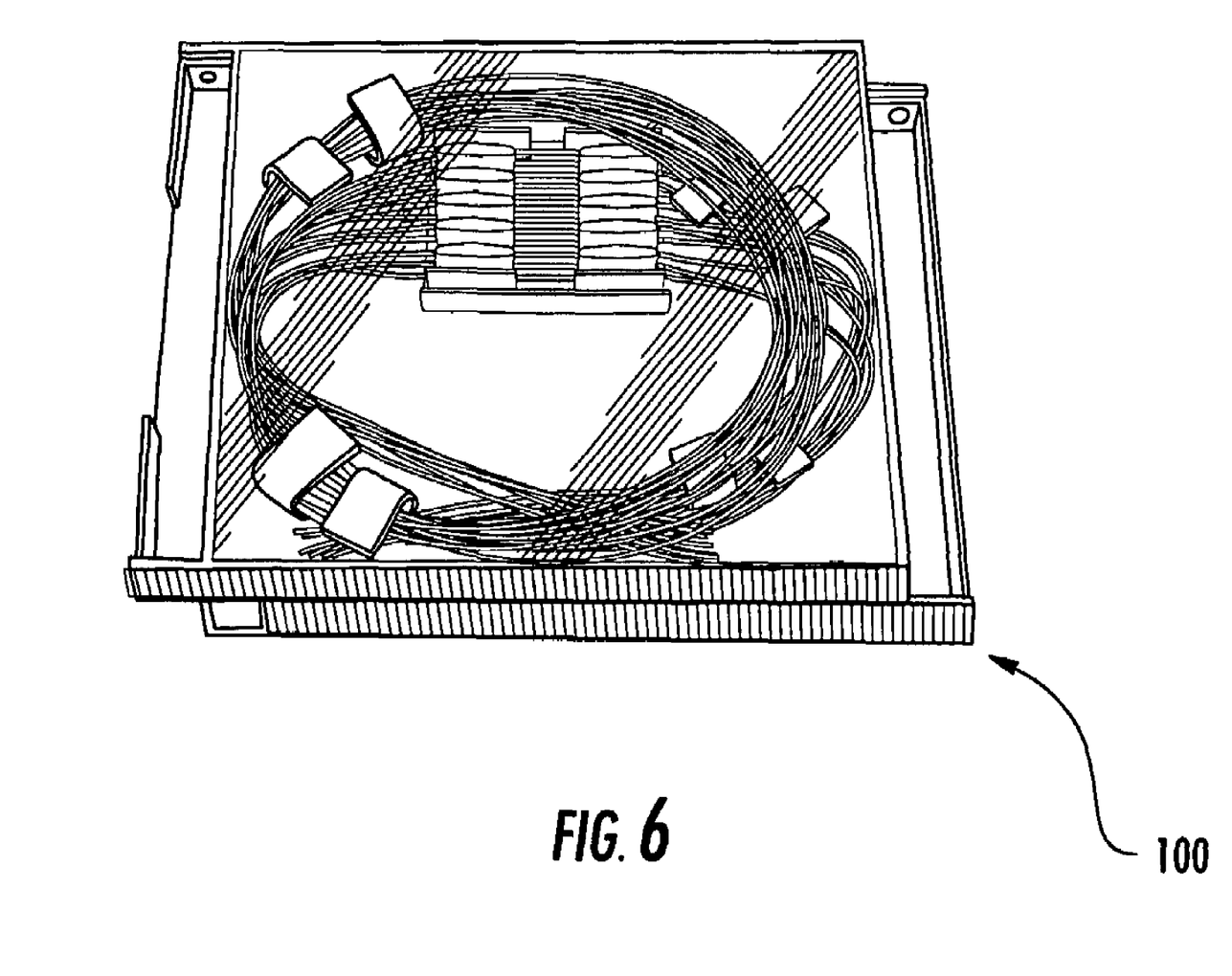
FIG. 6 is a perspective view of the apparatus of FIG. 1 with the first and second slack fiber storage segments in their closed positions.

The illustrated splice tray 100 includes a central segment 112, a first slack fiber storage segment 120 and a second slack fiber storage segment 130. The first and second slack fiber storage segments 120, 130 are pivotally connected, respectively, to a first end 118 and an opposite second end 122 of the central segment 112. The central segment 112 defines a splice chamber 114 configured to receive a plurality of fiber optic splices 116. Each of the first and second slack fiber storage segments 120, 130 has an open position extending from the respective first and second end 118, 122 away from the central segment 112, as illustrated in FIGS. 1 and 2, and a closed position extending over the central segment 112, as illustrated in FIG. 6.

As best seen in FIG. 2, a first plurality of slack fiber guide members 128 are provided on the first slack fiber storage segment 120, which are configured to receive and retain a loop 105a of the optical fibers 105. A plurality of slack fiber guide members 132 on the second slack fiber storage segment 130 are configured to receive and retain a loop 110a of the optical fibers 110.

As also seen in FIGS. 1 and 2, a splice receiving member 138 on the central segment 112 also provides a fiber guide member for respective selected fibers from the optical fibers 105 and 110 that are spliced together. In the illustrated embodiments of FIGS. 1 and 2, the splice receiving member 138 serves both as a guide member for spliced ones of the respective plurality of fibers 105, 110 and further provides a positioning slot arrangement for receiving a formed splice between the respective ones of the fibers with a protective jacket thereon.

Inlet/outlet fiber guide members are also illustrated in the central segment 112. More particularly, a fiber entrance 136 to the splice chamber 114 allows access to the chamber 114 and defines a fiber guide member for the first plurality of fibers 105 and a fiber exit 134 to the splice chamber 114 provides access to the chamber 114 and defines a guide member for the second plurality of optical fibers 110 on the central segment 112. The fiber entrance 136 on the central segment 112 and one 128a, 128b of the first plurality of slack fiber guide members 128 define a first fiber path 207 extending from the central segment 112 to the first slack fiber storage segment 120. The fiber exit 134 and one 132a, 132b of the second plurality of slack fiber guide members 132 define a second fiber path 205 extending from the central segment 112 to the second slack fiber storage segment 130.

Figure 4:
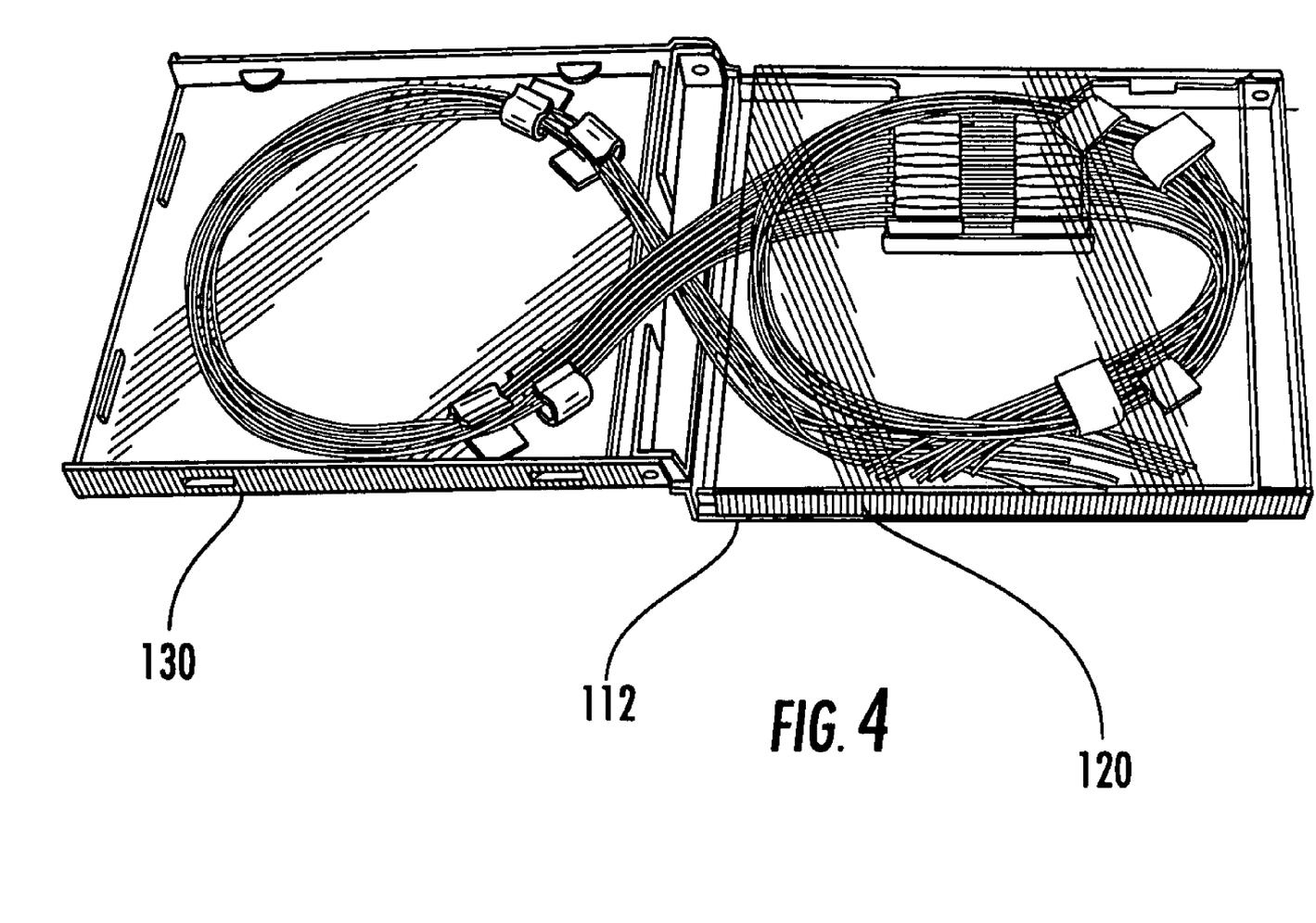
FIG. 4 is a perspective view of the apparatus of FIG. 1 with the first slack fiber storage segment in its closed position.
Figure 5:
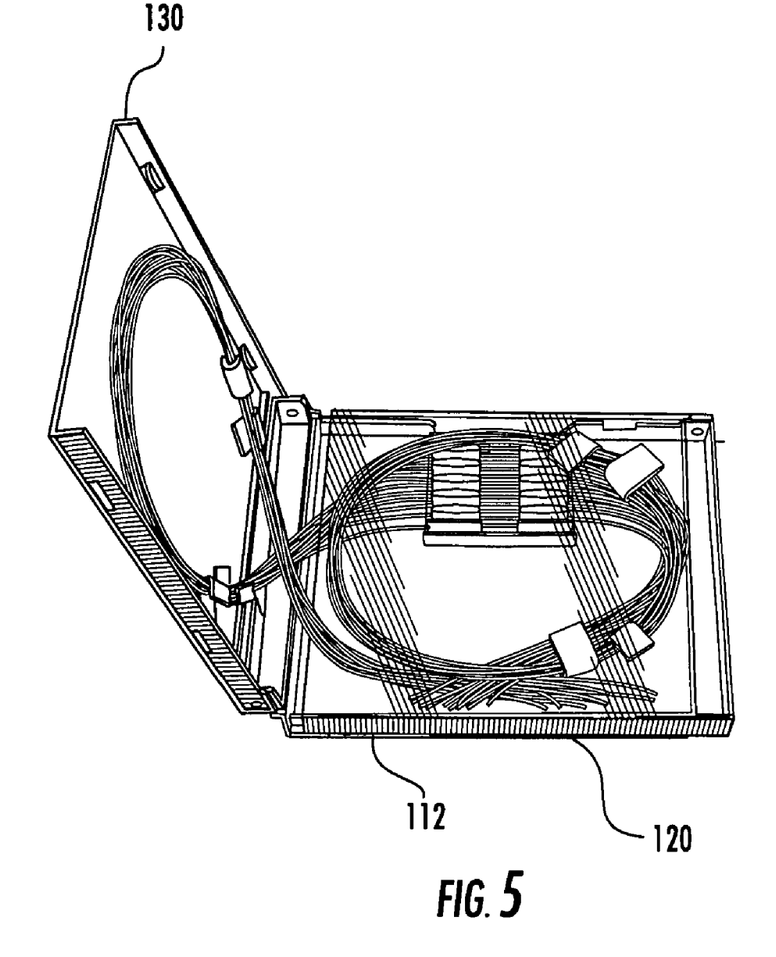
FIG. 5 is a perspective view of the apparatus of FIG. 1 with the second slack fiber storage segment in an intermediate position between its open and closed positions.

As further shown in FIG. 2, the splice receiving member 138 and a second one 128a', 128b' of the first plurality of slack fiber guide members 128 define a third fiber path 209 extending from the central segment 112 to the first slack fiber storage segment 120. The splice receiving member 138 and a second one 132a', 132b' of the second plurality of slack fiber guide members 132 define a fourth fiber path 211 extending from the central segment 112 to the second slack fiber storage segment 130. An intersection of the first fiber path 207 and the third fiber path 209 define a first fiber cross-over location 220 proximate an intermediate or mid portion of the first end 118 of the central segment 112. The first fiber cross-over location 220 is positioned so as to limit bending of optical fibers extending along the first fiber path 207 and the third fiber path 209 when the first slack fiber storage segment is moved from its opened position (FIG. 1) to its closed position (FIGS. 4, 5 and 6). In other words, the respective optical fibers are predominantly subjected to twisting during rotation while maintaining the recommended minimum bend radius to reduce the risk of damage to the fibers during closure of the first slack fiber storage segment 120.

The second fiber path 205 and the fourth fiber path 211 define a second fiber cross-over location 222 proximate an intermediate or mid portion of the second end 116 of the central segment 112 to similarly limit bending of optical fibers of the plurality of optical fibers 110 extending along the second 205 and fourth 211 fiber paths when the second slack fiber storage segment 130 is moved from its opened position (FIG. 2) to its closed position (FIG. 6).

As shown in FIGS. 1 and 2, in the illustrated embodiments, the respective slack fiber guide members 128, 132 may be opposed pairs of guide members. As seen in FIGS. 1 and 2, the respective pairs may be opposing tabs and/or clips provided in pairs 128a, 128b, 128a', 128b', 132a, 132b, 132a', 132b'.

As also shown in the embodiments of FIGS. 1 and 2, the pivotal connection between the respective slack fiber storage segments 120, 130 and the central segment 112 may be provided by a respective first hinge 140 and second hinge 150. In some embodiments, the first and second hinges 140, 150 may be living hinges and the central segment 112, the first slack fiber storage segment 120 and the second slack fiber storage segment 130 may be polypropylene (PP). In other embodiments, a mechanical hinge may be used as shown in FIGS. 1 and 2 and the central segment 112, the first slack fiber storage segment 120 and the second slack fiber storage segment 130 may be polycarbonate and/or other suitable engineering thermoplastic.

As seen in FIG. 2, in the illustrated embodiments, the first plurality of optical fibers 105 extend along the first fiber path 207 and the third fiber path 209 and are looped into a loop 105a on the first slack fiber storage segment 120 so that the first plurality of optical fibers 105 crosses over itself proximate the first fiber cross-over location 220. The second plurality of optical fibers 110 extend along the second fiber path 205 and the fourth fiber path 211 and are looped into a loop 110a on the second slack fiber storage segment 130 so that the second plurality of optical fibers 110 crosses over itself proximate the second fiber cross-over location 222.

As further seen in FIG. 2, ones of the first plurality of optical fibers 105 are spliced to corresponding ones of the second plurality of optical fibers 110 to define a plurality of fiber optic splices 116. For example, the first plurality of optical fibers 105 may be fibers extending from a subscriber location and may be coupled by splices to a second plurality of optical fibers 110 extending to a connection panel associated with a central office or the like for use in providing service selectively to ones of the subscribers associated with respective optical fibers included in the first plurality of optical fibers 105.

More particularly, the first plurality of optical fibers 105 may be releasably retained with a loop 105a therein on the first slack fiber storage segment 120 by the first plurality of slack fiber guide members 128. The second plurality of optical fibers 110 may be releasably retained with a loop 110a therein on the second slack fiber storage segment 130 by the second plurality of the slack fiber guide members 132. Thus, an operator, when accessing individual fibers for purposes of forming a splice 116 or the like, may separately extract the loops 105a, 110a of the respective plurality of fibers 105, 110 to access individual fibers and then return the loops using the clip members after formation of the splice. Such an approach may reduce tangling and the like of the respective optical fibers as splices may be formed in different combinations and at different times requiring repeated access to the respective optical fibers.

Figure 3:
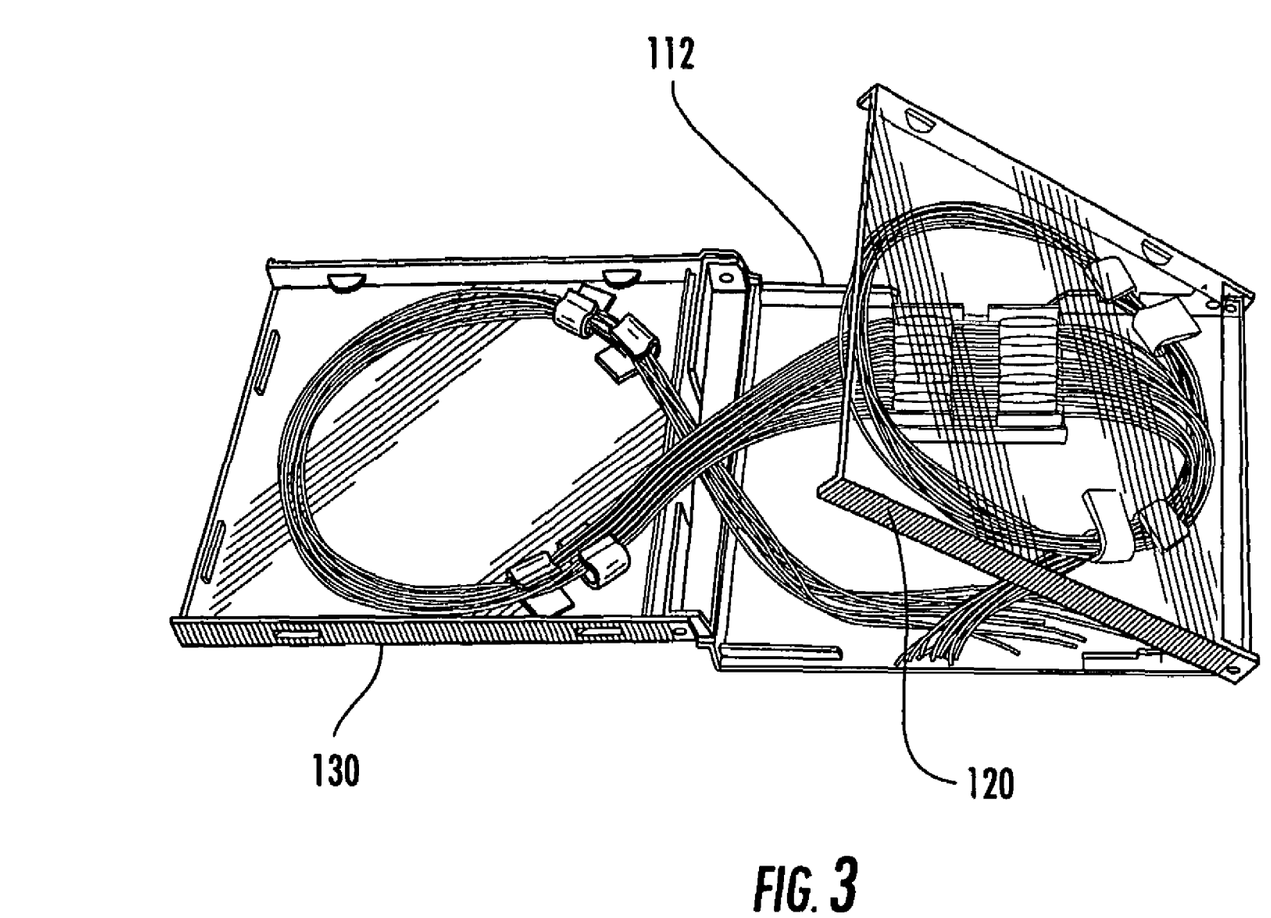
FIG. 3 is a perspective view of the apparatus of FIG. 1 with the first slack fiber storage segment in an intermediate position between its open and closed positions.

While the illustrated embodiments of a fiber optic splice storage apparatus or splice tray 100 have generally been described above primarily with reference to the open positions of FIGS. 1 and 2, the splice tray 100 is further illustrated in different conditions in FIGS. 3-6. More particularly, FIG. 3 illustrates the first slack fiber storage segment 120 in transition from its open position to a closed position extending over the central segment 112. FIG. 4 illustrates the first slack fiber segment 120 in its closed position extending over the central segment 112 while the second slack fiber storage segment 130 is still in the open position. FIG. 5 illustrates the second slack fiber storage segment 130 at an intermediate position during transition from the open to the closed position.

Finally, FIG. 6 illustrates both the first and second slack fiber storage segments 120, 130 in their closed position extending over the central segment 112. More particularly, for the illustrated embodiments, the second slack fiber segment 130 extends over both the central segment 112 and the first slack fiber storage segment 120. However, it will be understood that the present invention is not limited to configurations where the second slack fiber storage segment 130 rests over the first slack fiber storage segment 120 in the closed position. For example, the first slack fiber storage segment 120 may extend over the second slack fiber storage segment 130 or a larger central segment 112 may be provided and the respective slack fiber storage segments 120, 130 may not extend over all and/or even a portion of each other.

In some embodiments, the first and/or second slack fiber storage segments 120, 130 can be secured in their respective closed positions by a latch or the like. The securing may be a hinge notch point or the like requiring an increased force to rotate from the closed position and/or a latch mechanism requiring activation of a securing mechanism by displacement or the like to release the respective slack fiber storage segments for rotational movement. Furthermore, as seen in FIG. 6, the first and/or second slack fiber storage segments 120, 130 may act as an integrated hinging cover for the splice tray that may be used instead of a conventional removable cover.

Figure 7:
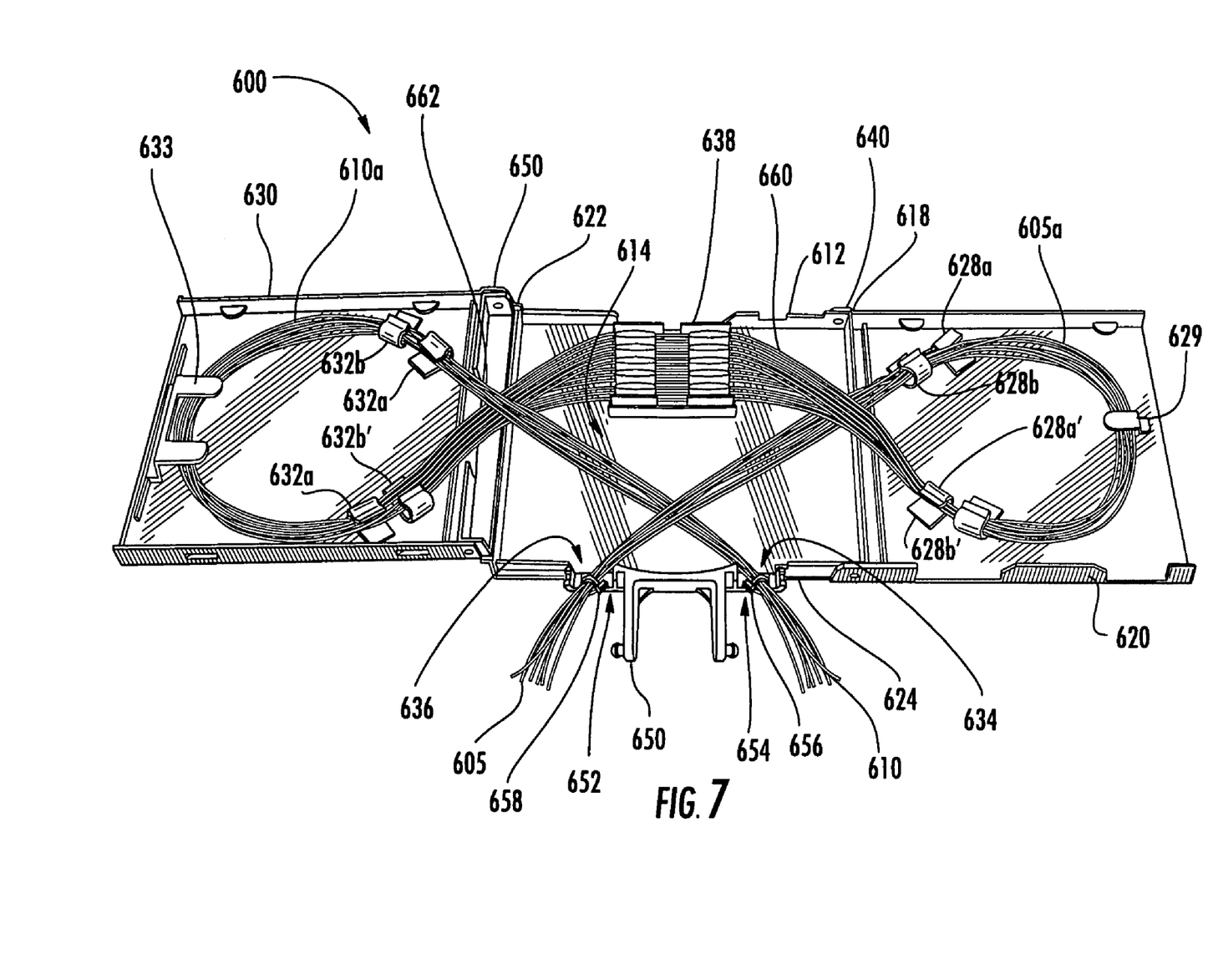
FIG. 7 is perspective view illustrating a fiber optic splice storage apparatus including two looped pluralities of optical fibers according to further embodiments of the present invention.
Figure 8:
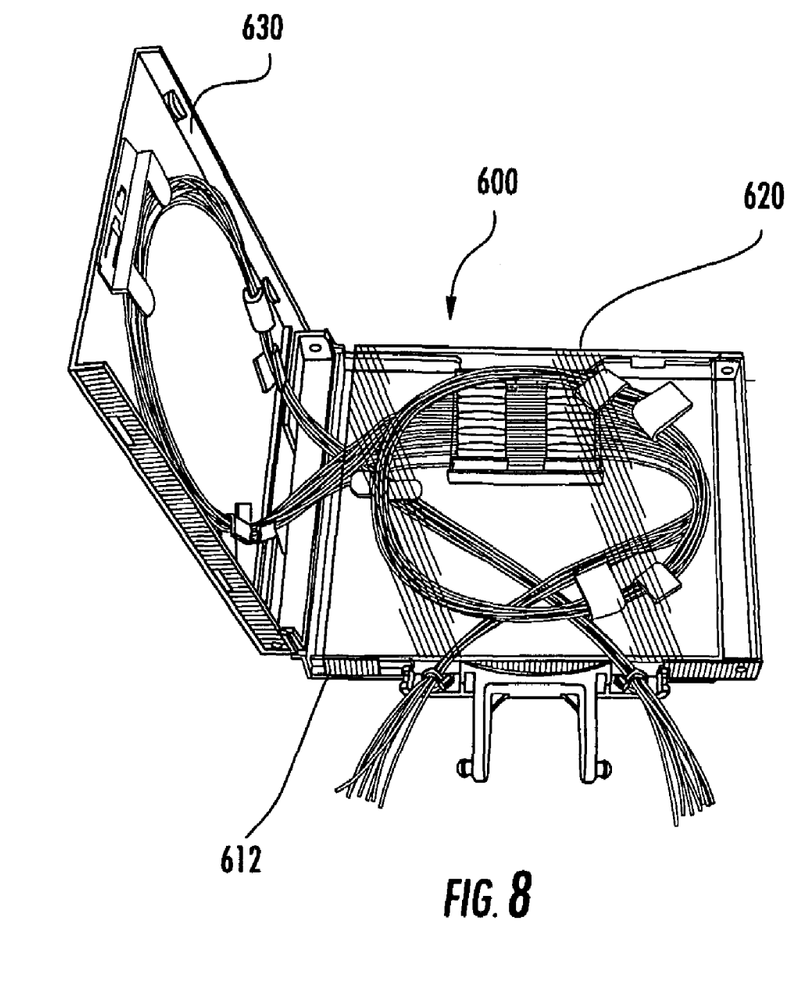
FIG. 8 is a perspective view of the apparatus of FIG. 7 with the first slack fiber storage segment in its closed position.
Figure 9:
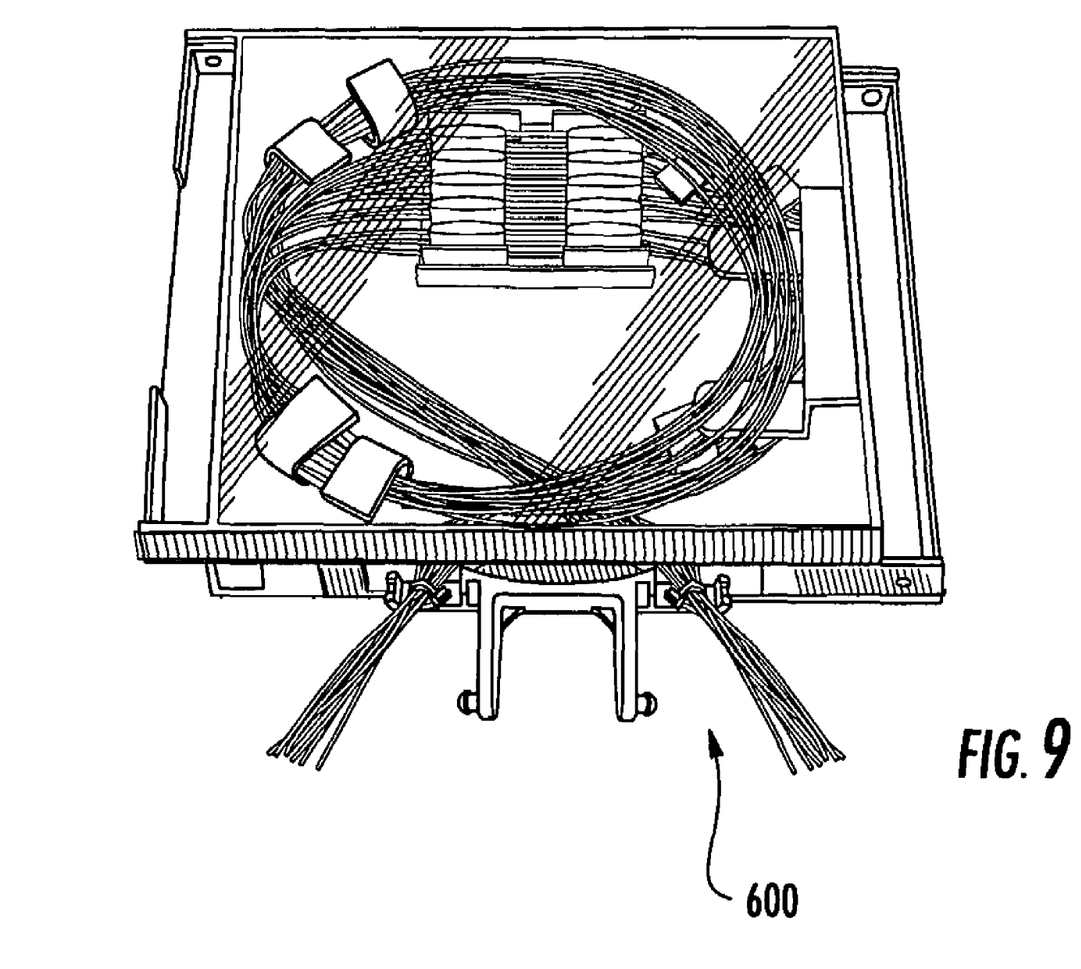
FIG. 9 is a perspective view of the apparatus of FIG. 7 with the first and second slack fiber storage segments in their closed positions.

A tri-fold fiber splice tray 600 according to further embodiments of the present invention will now be described with reference to FIGS. 7-9. More particularly, FIG. 7 illustrates the tri-fold fiber splice tray 600 in an open position, FIG. 8 illustrates one side in an open and one side in a closed position and FIG. 9 illustrates the tri-fold fiber splice tray 600 in a fully closed orientation. Note that similarly numbered items (e.g., 112, 612) in the embodiments of FIGS. 7-9 may correspond generally to those items as described previously except as specifically noted herein.

The fiber splice tray 600 illustrated in the embodiments of FIG. 7 includes a central segment 612 defining a splice chamber 614 configured to receive a plurality of fiber optic splices. A first slack fiber storage segment 620 is pivotally connected to a first end 618 of the central segment 612. The first slack fiber storage segment 620 has an open position extending from the first end 618 away from the central segment 612 as shown in FIG. 7 and a closed position extending over the second segment as 112 seen in FIGS. 8 and 9.

A second slack fiber storage segment 630 is pivotally connected to a second end 622 of the central segment 612. The second end 622 is opposite the first end 618. The second slack fiber storage segment 630 has an open position extending from the second end 622 away from central segment 612 as seen in FIG. 7 and a closed position extending over the central segment 612 as seen in FIG. 9.

The central segment 612 includes a fiber entrance 636 to the splice chamber 614 on a third end 624 of the central segment 612 and a fiber exit 634 to the splice chamber 614 on the third end 624 of the central segment 612. The third end 624 extends from the first end 618 to the second end 622.

First 628a, 628b and second 628a', 628b' slack fiber guide members are provided on the first slack fiber storage segment 620 that are configured to receive and maintain a loop 605a of the optical fibers 605. The fiber entrance 636 and the first slack fiber guide member 628a, 628b define a first fiber path extending from the central segment 612 to the first slack fiber storage segment 620. Also shown in the embodiments seen in FIG. 7 are further slack fiber guide members 629, 633 on respective ends of the segment 620, 630 displaced from the central segment 612 that may serve to limit extension of respective fibers 605, 610 beyond the outer edges of the segments 620, 630.

Similarly, third 632a, 632b and fourth 632a', 632b' slack fiber guide members are provided on the second slack fiber storage segment 630 that are configured to receive and retain a loop 610a of the optical fibers 610. The fiber exit 634 and the slack fiber guide member 623a, 632b define a second fiber path extending from the central segment 612 to the second slack fiber storage segment 630.

A splice receiving member 638 is also shown on the central segment 612. The splice receiving member 638 and the slack fiber guide member 628a', 628b' define a third fiber path extending from the central segment 612 to the first slack fiber storage element 620. The splice receiving member 638 and the slack fiber guide member 632a, 632b define a fourth fiber path extending from the central segment 612 to the second slack fiber storage segment 630. An intersection of the first and third fiber paths defines a first fiber cross-over location 660 proximate an intermediate portion of the first end 618 to limit bending of the optical fibers 605 extending along the first and third fiber paths when the first slack fiber storage segment 620 is moved from its open position (FIG. 7) to its closed position (FIGS. 8 and 9). The second and fourth fiber paths define a second fiber cross-over location 622 proximate an intermediate portion of the second end 622 to limit bending of the optical fibers 610 extending along the second and fourth fiber paths when the second slack fiber storage segment 630 is moved from its open position (FIGS. 7 and 8) to its closed position (FIG. 9).

The embodiments illustrated in FIGS. 7-9 differ from those described with reference to FIGS. 1-6 in the inclusion of a storage apparatus mounting member on the third end 124, 624 of the central segment 112, 612. As illustrated in FIG. 7-9 the storage apparatus-mounting member is provided by tray mounting legs 650. The tray mounting legs extend from the third end 624 of the central segment 612 and are configured to allow the splice tray 600 to be pivotally mounted to an enclosure. The fiber entrance 636 is positioned on the third end 624 between the tray mounting legs 650 and the second end 622 while the fiber exit 634 is positioned on the third end 624 between the tray mounting legs 650 and the first end 618. In other words, the tray mounting legs 650 are positioned between the fiber entrance 636 and fiber exit 634.

As further shown in the embodiments of FIG. 7-9, the tray mounting legs 650 are a molded member including respective openings 652 and 654 that align with and correspond to the respective fiber entrance 636 and fiber exit 634 to further facilitate in the fiber guide function of the entrance 636 and exit 634. The fiber guide embodiments of FIG. 7-9 also include respective twist ties 652, 656 or other removable attachment means positioning the respective optical fibers 605, 610 in position in the openings 634, 636.

FIG. 8 illustrates the splice tray 600 with the first slack fiber storage segment 620 in its closed position and the second segment 630 in its open position. FIG. 9 shows both segments 620, 630 in their closed positions extending over the central segment 612.

Figure 10:
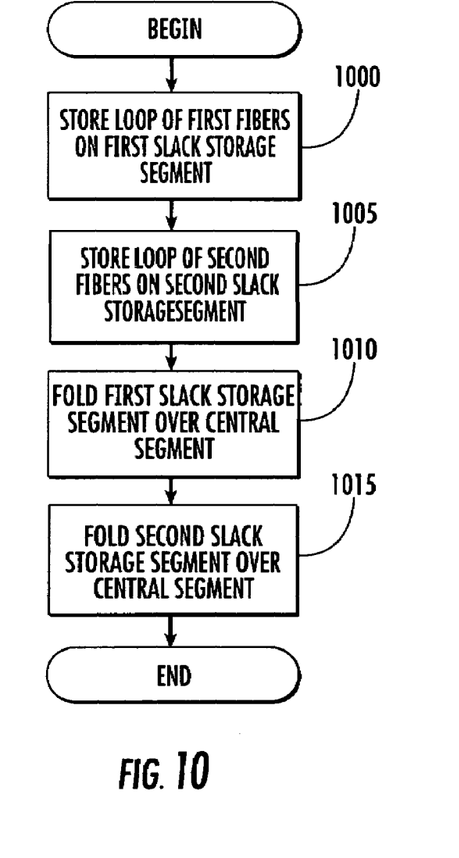
FIG. 10 is a flowchart illustrating operations for storing slack fiber in a fiber optic splice storage apparatus according to some embodiments of the present invention.

Methods of storing slack fiber in a fiber optic splice storage apparatus according to some embodiments of the present invention will now be described with reference to FIGS. 10 and 11. Referring first to the flowchart illustration of FIG. 10, operations begin by storing a loop of a first plurality of fibers on a first slack fiber storage segment of the splice storage apparatus that is pivotally connected to a first end of a central segment of the splice storage apparatus (Block 1000). A loop of a second plurality of fibers is stored on a second slack fiber storage segment of the splice storage apparatus that is pivotally connected to a second end of the central segment opposite the first end (Block 1005). The first slack fiber storage segment is folded to a closed position extending over the central segment (Block 1010). The second slack fiber storage segment is folded to a closed position extending over the central segment (Block 1015).

In some embodiments, storing the loop of the first plurality of fibers at Block 1000 may include twisting the first plurality of fibers to form the loop with a cross-over location position proximate a mid point of the connection between the first slack fiber storage segment and the central segment. Storing the loop of the second plurality of fibers at Block 1005 may similarly include twisting a second plurality of fibers to form the loop with a fiber cross-over location position proximate the mid point of the connection between the second slack fiber storage segment and the central segment. Storing of the respective loops of the pluralities of fibers may also include positioning a first segment of the fibers in a first slack fiber guide member on the respective slack fiber storage segments and a second segment of the respective plurality of fibers in a second slack fiber guide member on the respective slack fiber storage segments.

Operations related to accessing a fiber stored in a fiber optic splice storage apparatus as described with reference to FIG. 10 will now be described with reference to FIG. 11 for some embodiments of the present invention. More particularly, the operations illustrated in FIG. 11 generally relate to coupling of one of a first plurality of fibers to a selected one of a second plurality of fibers to form a splice therebetween.

Figure 11:
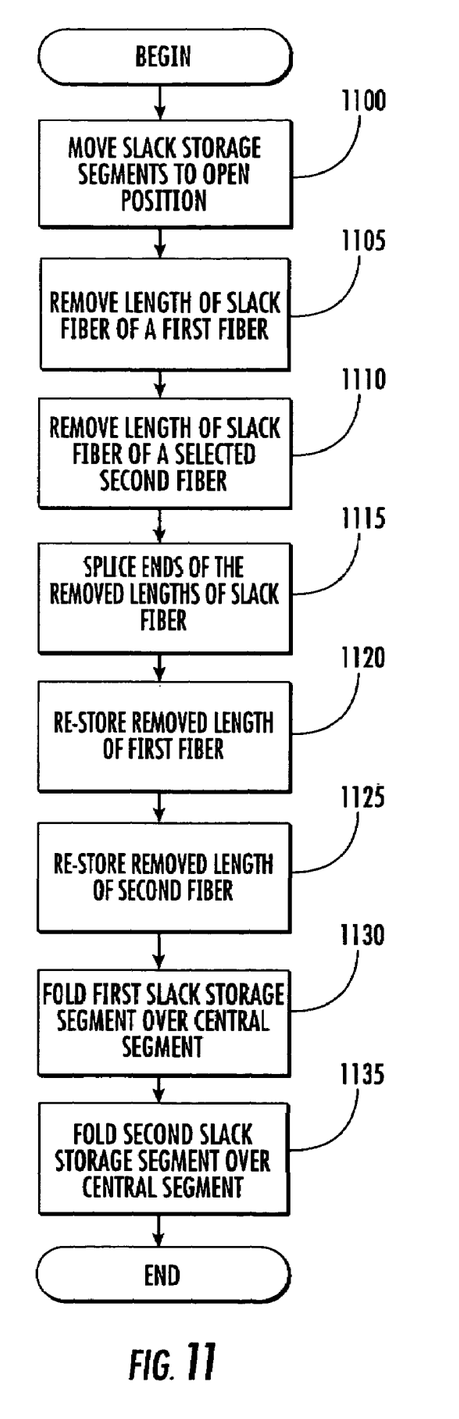
FIG. 11 is a flowchart illustrating operations for storing slack fiber in a fiber optic splice storage apparatus according to further embodiments of the present invention.

As illustrated in the embodiments of FIG. 11 operations begin by moving the first and second slack fiber storage elements to their open positions (Block 1100). A length of slack fiber of one of the first plurality of fibers is removed from the slack fiber guide members on the first slack fiber storage element (Block 1105). Note that operations related to removing one of the fibers may include removing the entire loop including all of the fibers from the first slack fiber storage element. A length of slack fiber of the corresponding selected one of the second plurality of fibers is removed from the slack fiber guide members on the second slack fiber storage element (Block 1110). As described with reference to Block 1105, the entire loop of fibers on the second slack fiber guide member may be removed during operations at Block 1110. Ends of the removed lengths of slack fiber of the respective ones of the first and second plurality of fibers are spliced to form the splice therebetween (Block 1115). The splice formed at Block 1115 may be positioned in a splice-receiving member on the central segment at Block 1115.

The removed length of slack fiber of the selected one of the first plurality of fibers and/or all of the first plurality of fibers are restored to the loop of the first plurality of fibers (Block 1120). Similarly, the selected one or plurality of the second plurality of fibers are restored to form a loop of the second plurality of fibers (Block 1125). The first slack fiber storage segment is folded to the closed position extending over the central segment (Block 1130). The second slack fiber storage segment is folded to the closed position extending over the central segment (Block 1153).

Fiber optic splice storage apparatus (splice trays) according to some embodiments of the present invention may be used in closures, cabinets, pedestals, boxes, shelves and the like. Some embodiments of the present invention provide a transparent (or opaque) tri fold hinging splice tray that automatically stores slack fiber required to splice fiber optic cables. In some embodiments of the present invention, fiber entrance and exit locations and tray mounting legs extending therebetween may allow the tray to pivot out of an enclosure prior to being unfolded. Some embodiments of the present invention may combine the access convenience of a large splice tray, such as a FOSC D tray available from Tyco Electronics Corporation, with the benefits of storing small trays, such as a FIST SOAS SE tray available from Tyco Electronics. Some embodiments of the present invention may provide for use of smaller fiber enclosures and the use of less skilled technicians in the field.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A fiber optic splice storage apparatus, comprising:
   a central segment defining a splice chamber configured to receive a plurality of fiber optic splices;
   a first slack fiber storage segment pivotally connected to a first end of the central segment and having an open position extending from the first end away from the central segment and a closed position extending over the central segment;
   a second slack fiber storage segment pivotally connected to a second end of the central segment, opposite the first end, the second slack fiber storage segment having an open position extending from the second end away from the central segment and a closed position extending over the same side of the central segment as the first slack fiber storage segment;
   a first plurality of slack fiber guide members on the first slack fiber storage segment configured to receive and retain a first loop of optical fibers; and
   a second plurality of slack fiber guide members on the second slack fiber storage segment configured to receive and retain a second loop of optical fibers.

2. The fiber optic splice storage apparatus of claim 1, further comprising first and second fiber guide members on the central segment in the splice chamber, wherein the first fiber guide member and one of the first plurality of slack fiber guide members define a first fiber path extending from the central segment to the first slack fiber storage segment and wherein the second fiber guide member and one of the second plurality of slack fiber guide members define a second fiber path extending from the central segment to the second slack fiber storage segment.

3. The fiber optic splice storage apparatus of claim 2, wherein the first fiber guide member comprises a fiber entrance to the splice chamber and the second fiber guide member comprises a fiber exit to the splice chamber.

4. The fiber optic splice storage apparatus of claim 2, wherein the central segment further includes a third fiber guide member and a fourth fiber guide member and wherein the third fiber guide member and a second one of the first plurality of slack fiber guide members define a third fiber path extending from the central segment to the first slack fiber storage segment and wherein the fourth fiber guide member and a second one of the second plurality of slack fiber guide members define a fourth fiber path extending from the central segment to the second slack fiber storage segment, an intersection of the first and third fiber paths defining a first fiber cross-over location proximate an intermediate portion of the first end to limit bending of optical fibers extending along the first and third fiber paths when the first slack fiber storage segment is moved from its opened position to its closed position and the second and fourth fiber paths defining a second fiber cross-over location proximate an intermediate portion of the second end to limit bending of optical fibers extending along the second and fourth fiber paths when the second slack fiber storage segment is moved from its opened position to its closed position.

5. The fiber optic splice storage apparatus of claim 4, wherein the third fiber guide member and the further fiber guide member comprise a splice receiving member.

6. The fiber optic splice storage apparatus of claim 4, wherein the first and second one of the first plurality of slack fiber guide members and the first and second one of the second plurality of slack fiber guide members each comprise an opposed pair of guide members.

7. The fiber optic splice storage apparatus of claim 4, further comprising a storage apparatus mounting member on a third end of the central segment, the third end extending from the first end to the second end, the storage apparatus mounting member being configured to allow the fiber optic splice storage apparatus to be pivotally mounted to an enclosure.

8. The fiber optic splice storage apparatus of claim 7, wherein the first fiber guide member on the central segment comprises a fiber entrance to the splice chamber on the third end of the central segment and wherein the second fiber guide member on the central segment comprises a fiber exit to the splice chamber on the third end of the central segment and wherein the storage apparatus mounting member is positioned between the fiber entrance and the fiber exit.

9. The fiber optic splice storage apparatus of claim 4, further comprising a first hinge pivotally connecting the first slack fiber storage segment to the central segment and a second hinge pivotally connecting the second slack fiber storage segment to the central segment.

10. The fiber optic splice storage apparatus of claim 9, wherein the central segment, the first slack fiber storage segment and the second slack fiber storage segment comprise polycarbonate.

11. The fiber optic splice storage apparatus of claim 9, wherein the first and second hinges are living hinges and wherein the central segment, the first slack fiber storage segment and the second slack fiber storage segment comprise polypropylene (PP).

12. The fiber optic splice storage apparatus of claim 4, wherein the fiber optic splice storage apparatus comprises a splice tray.

13. The fiber optic splice storage apparatus of claim 4, wherein, when the first and second slack fiber storage segments are in their closed positions, the second slack fiber storage segment extends over the first slack fiber storage segment.

14. The fiber optic splice storage apparatus of claim 4, further comprising:
   a first plurality of optical fibers extending along the first fiber path and the third fiber path and being looped on the first slack fiber storage segment so that the first plurality of optical fibers crosses over itself proximate the first fiber cross-over location; and
   a second plurality of optical fibers extending along the second fiber path and the fourth fiber path and being looped on the second slack fiber storage segment so that the second plurality of optical fibers crosses over itself proximate the second fiber cross-over location.

15. The fiber optic splice storage apparatus of claim 14, wherein ones of the first plurality of optical fibers are spliced to corresponding ones of the second plurality of optical fibers to define the plurality of fiber optic splices.

16. The fiber optic splice storage apparatus of claim 14, wherein the first plurality of optical fibers is releasably retained with a loop therein on the first slack fiber storage segment by the first and second one of the first plurality of slack fiber guide members and wherein the second plurality of optical fibers is releasably retained with a loop therein on the second slack fiber storage segment by the first and second one of the second plurality of slack fiber guide members.

17. The fiber optic splice storage apparatus of claim 14, wherein locations of the first fiber cross-over point and the second fiber cross-over point are selected to provide a minimum bend radius for the first and second plurality of optical fibers when the first and second slack fiber storage segments are in their closed positions.

18. The fiber optic splice storage apparatus of claim 1, wherein the first and/or second slack fiber storage segment comprise an integrated hinging cover extending over the central segment.

19. A tri-fold fiber splice tray, comprising:
   a central segment defining a splice chamber configured to receive a plurality of fiber optic splices;
   a first slack fiber storage segment pivotally connected to a first end of the central segment and having an open position extending from the first end away from the central segment and a closed position extending over the central segment;
   a second slack fiber storage segment pivotally connected to a second end of the central segment, opposite the first end, the second slack fiber storage segment having an open position extending from the second end away from the central segment and a closed position extending over the central segment;
   tray mounting legs extending from a third end of the central segment, the third end extending from the first end to the second end, the tray mounting legs being configured to allow the splice tray to be pivotally mounted to an enclosure;

a fiber entrance to the splice chamber on the third end of the central segment between the tray mounting legs and the second end;

a fiber exit to the splice chamber on the third end of the central segment between the tray mounting legs and the first end;

a first and second slack fiber guide member on the first slack fiber storage segment configured to receive and retain a loop of optical fibers, the fiber entrance and the first slack fiber guide member defining a first fiber path extending from the central segment to the first slack fiber storage segment;

a third and fourth slack fiber guide member on the second slack fiber storage segment configured to receive and retain a loop of optical fibers, the fiber exit and the third slack fiber guide member defining a second fiber path extending from the central segment to the second slack fiber storage segment; and a splice receiving member on the central segment, wherein the splice receiving member and the second slack fiber guide member define a third fiber path extending from the central segment to the first slack fiber storage segment and wherein the splice receiving member and the fourth slack fiber guide member define a fourth fiber path extending from the central segment to the second slack fiber storage segment, an intersection of the first and third fiber paths defining a first fiber cross-over location proximate an intermediate portion of the first end to limit bending of optical fibers extending along the first and third fiber paths when the first slack fiber storage segment is moved from its opened position to its closed position and the second and fourth fiber paths defining a second fiber cross-over location proximate an intermediate portion of the second end to limit bending of optical fibers extending along the second and fourth fiber paths when the second slack fiber storage segment is moved from its opened position to its closed position.

20. A method of storing slack fiber in a fiber optic splice storage apparatus, the method comprising:

storing a loop of a first plurality of fibers on a first slack fiber storage segment of the splice storage apparatus pivotally connected to a first end of a central segment of the splice storage apparatus;

storing a loop of a second plurality of fibers on a second slack fiber storage segment of the splice storage apparatus pivotally connected to a second end of the central segment, opposite the first end;

folding the first slack fiber storage segment to a closed position extending over the central segment; and folding the second slack fiber storage segment to a closed position extending over the same side of the central segment as the first slack fiber storage segment.

21. The method of claim 20, wherein storing the loop of the first plurality of fibers includes twisting the first plurality of fibers to form the loop with a fiber cross-over location positioned proximate a midpoint of the connection between the first slack fiber storage segment and the central segment and wherein storing the loop of the second plurality of fibers includes twisting the second plurality of fibers to form the loop with a fiber cross-over location positioned proximate a midpoint of the connection between the second slack fiber storage segment and the central segment.

22. The method of claim 21, wherein storing the loop of the first plurality of fibers includes positioning a first segment of the first plurality of fibers in a first slack fiber guide member on the first slack fiber storage segment and a second segment of the first plurality of fibers in a second slack fiber guide member on the first slack fiber storage segment and wherein storing the loop of the second plurality of fibers includes positioning a first segment of the second plurality of fibers in a first slack fiber guide member on the second slack fiber storage segment and a second segment of the second plurality of fibers in a second slack fiber guide member on the second slack fiber storage segment.

23. The method of claim 22, further comprising:

coupling one of the first plurality of fibers to a selected one of the second plurality of fibers to form a splice therebetween; and positioning the splice in a splice receiving member on the central segment.

24. The method of claim 23, wherein coupling one of the first plurality of fibers comprises:

moving the first and second slack fiber storage elements to their open positions;

removing a length of slack fiber of the one of the first plurality of fibers from the first and second slack fiber guide members on the first slack fiber storage element;

removing a length of slack fiber of the selected one of the second plurality of fibers from the first and second slack fiber guide members on the second slack fiber storage element; and splicing ends of the removed lengths of slack fiber of the one of the first plurality of fibers and the selected one of the second plurality of fibers to form the splice therebetween.

25. The method of claim 24, wherein splicing ends of the removed lengths is followed by:

re-storing the removed length of slack fiber of the one of the first plurality of fibers to the loop of the first plurality of fibers;

re-storing the removed length of slack fiber of the selected one of the second plurality of fibers to the loop of the second plurality of fibers;

folding the first slack fiber storage segment to the closed position extending over the central segment; and folding the second slack fiber storage segment to the closed position extending over the central segment.

26. The method of claim 25, wherein:

removing the length of slack fiber of the one of the first plurality of fibers includes removing the loop of the first plurality of fibers from the first slack fiber storage element;

removing the length of slack fiber of the selected one of the second plurality of fibers includes removing the loop of the second plurality of fibers from the second slack fiber storage element;

re-storing the removed length of slack fiber of the one of the first plurality of fibers to the loop of the first plurality of fibers includes re-storing the loop of the first plurality of fibers to the first slack fiber storage segment; and re-storing the removed length of slack fiber of the selected one of the second plurality of fibers includes re-storing the loop of the second plurality of fibers to the second slack fiber storage segment.

* * * * *